United States Patent
Tyson

(10) Patent No.: US 6,625,568 B2
(45) Date of Patent: Sep. 23, 2003

(54) SOUND-BASED VESSEL CLEANER INSPECTION

(76) Inventor: James Tyson, 7563 Park Ave., Pennsauken, NJ (US) 08109

( * ) Notice: Subject to any disclaimer, the term of this patent is extended or adjusted under 35 U.S.C. 154(b) by 0 days.

(21) Appl. No.: 10/039,835

(22) Filed: Oct. 23, 2001

(65) Prior Publication Data

US 2002/0107665 A1 Aug. 8, 2002

Related U.S. Application Data

(60) Provisional application No. 60/281,588, filed on Apr. 5, 2001, and provisional application No. 60/242,555, filed on Oct. 23, 2000.

(51) Int. Cl.[7] ............................................... B22D 11/16
(52) U.S. Cl. ...................... 702/183; 702/39; 702/54; 702/56; 702/105; 702/159; 702/171; 702/182
(58) Field of Search ............................. 702/39, 50, 54, 702/55–57, 66, 105, 146, 159, 171, 182, 183, 193, 194–198, FOR 135, FOR 136, FOR 137, FOR 139, FOR 155, FOR 157, FOR 159–160; 134/902, 105, 110, 111, 186, 184, 1.3, 25.4, 148, 153, 200, 201, 104.1; 340/384.1, 384.2, 384.73; 239/227, 240, 243, 246, DIG. 1

(56) References Cited

U.S. PATENT DOCUMENTS

| 4,183,011 A | * 1/1980 | Massa ......................... 134/184 |
| 5,759,424 A | 6/1998 | Imatake et al. |
| 5,904,163 A | * 5/1999 | Inoue et al. ............... 134/56 D |
| 5,911,232 A | * 6/1999 | Mokuo et al. ............... 134/184 |
| 5,954,271 A | 9/1999 | Le ............................. 239/227 |
| 6,092,538 A | * 7/2000 | Arai et al. .................... 134/1.3 |
| 6,123,271 A | 9/2000 | Delaney et al. ............. 239/227 |
| 6,178,974 B1 | * 1/2001 | Kobayashi et al. .......... 134/1.3 |
| 6,431,185 B1 | * 8/2002 | Tomita et al. ............... 134/1.3 |
| 2001/0006072 A1 | * 7/2001 | Kobayashi et al. ....... 134/64 R |

FOREIGN PATENT DOCUMENTS

| DE | 4010066 A1 | * 10/1991 | ........... A47L/15/22 |
| DE | 4020898 A1 | * 1/1992 | ........... A47L/15/22 |
| DE | 4225614 A1 | * 2/1994 | ........... A47L/15/42 |
| DE | 19732856 A1 | * 2/1999 | ........... A47L/15/22 |
| EP | 0392586 A1 | * 10/1990 | |
| JP | 409295114 a | * 11/1997 | |
| JP | 2000166832 | * 6/2000 | |

* cited by examiner

Primary Examiner—Marc S. Hoff
Assistant Examiner—Carol S. W. Tsai
(74) Attorney, Agent, or Firm—Norman E. Lehrer

(57) ABSTRACT

Sound detection techniques and sound discrimination techniques are used to analyze the real time sounds generated during the operation of cleaning heads operating within a vessel to determine if the cleaning heads are operating properly. During a typical cleaning operation pressurized cleaning solution is dispensed through a rotating nozzle assembly inside the vessel. As the nozzles rotate the spray moves about the interior of the vessel creating a unique sound pattern. By placing one or more pickups on the exterior of the vessel the sound is captured and fed to an analyzing device for analysis. Key properties such as, but not limited to, sound pressure levels, amplitude variations, spectral content, and rotational information are extracted and analyzed against the reference parameters.

27 Claims, 7 Drawing Sheets

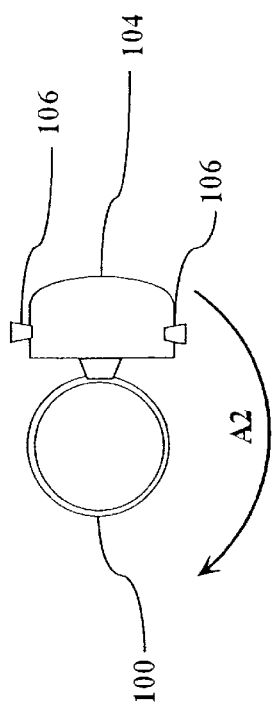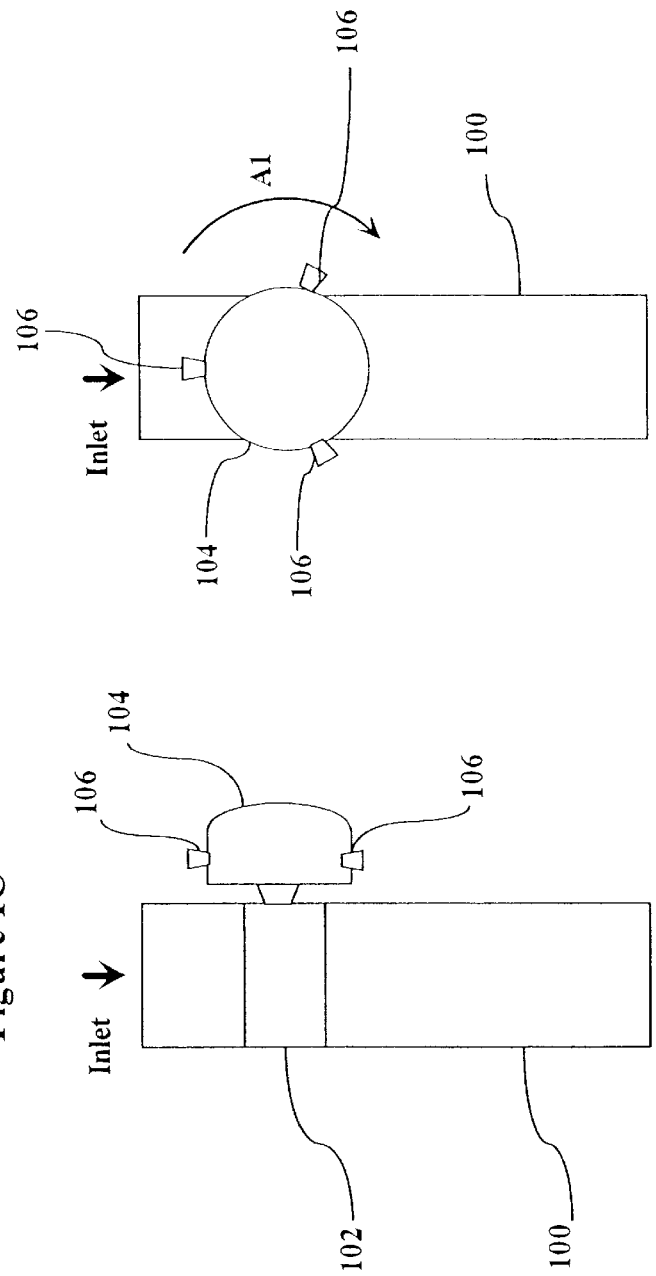
Figure 1B
Figure 1C
Figure 1A

SOUND-BASED VESSEL CLEANER INSPECTION

This is based upon Provisional Application Ser. No. 60/242,555, filed on Oct. 23, 2000 and Ser. No. 60/281,588, filed on Apr. 5, 2001, both of which are incorporated fully herein by reference.

FIELD OF THE INVENTION

The present invention relates to method and apparatus for monitoring and evaluating the operation of rotary element cleaning devices from the exterior of a vessel based upon sound analysis.

BACKGROUND OF THE INVENTION

There are many machines that include a vessel having cleaning elements (e.g., rotary, reciprocating, stationary, etc.) contained within them for the purpose of cleaning items within the vessel, or even the vessel itself. Consider, for example, the common dishwasher. A dishwasher typically comprises a closed vessel with a rotating cleaning device located at the bottom of the vessel. When the dishwasher is operating, there is no way of seeing inside to determine if the cleaning elements are operating properly. Frequently, a fork or knife may fall through the dish rack and block the rotation of the rotating spray arm, which is part of the rotary cleaning element. The result of the blockage is a poor cleaning cycle which in turn results in unclean dishes. However, the first indication of this problem is at the end of the cleaning cycle when the dishwasher is opened to empty the contents, and at this point it is too late, as the time and resources associated with operation of the dishwasher have already been consumed.

Current industry solutions for this problem include installation of a window in the vessel, which gives a visual accounting of the cleaning activity, or the use of an electronic pressure switch inside the vessel that senses the impact of the spray coming from the spray arm. Both have significant shortcomings.

Most vessels do not have windows since they are very expensive to install and labor intensive to monitor. To install a window an opening must be cut through the vessel wall. The interior of the enclosure must then be illuminated so the observer may see through the window into the vessel. Even with the illumination, the observer may not be able to view the operation of the cleaning elements through the window due to cleaning solution collecting on the inner surface of the window. In the case of a rotary cleaning element, all the observer can tell is that the rotary element is (or is not) rotating and/or spraying liquid; it is very difficult, if not impossible, to make significant qualitative assessment of the operation of the rotary element. The problem is further complicated if two or more cleaning devices are operated simultaneously within the vessel. One may stop while the other(s) continues to operate. The observer may see the spray from the properly-operating device striking the window and be given the false impression that all of the devices are operating properly. Mistakenly the observer may believe that all is well.

Installation of a pressure switch that generates a signal when impacted by the spray from the cleaning devices is a more reliable solution than the above-described window solution. The primary downfall to pressure switches involves environmental considerations which may degrade the switch and/or its performance, such as high temperatures, pressurization and caustic cleaning solutions.

As in the case of the window, installing the pressure switch also requires a penetration through the vessel wall. The positioning of the switch is critical since to be reliable it must receive "hits" from the cleaning spray on a regular basis. The only location meeting this requirement may be a very small area relative to the spray device. A poorly placed sensor will likely yield unreliable indications.

As noted above, both the window and the pressure switch solutions require penetrations to be made through the vessel wall. In addition to being expensive, in a great many instances it is not possible due to the intended usage, construction, or placement of the vessel within a facility.

It is common in the food, beverage and drug industries to utilize large vessels for processing, storing and/or transporting product. For example, tanks are used in the production, storage and transporting of whisky, beer & wine. These tanks range in size from several hundred gallons to tens of thousands of gallons. In order to produce an acceptable product for sale and/or to satisfy FDA regulations, these tanks must be hygienically cleaned between usages. Specialized cleaning equipment has been developed that can be inserted or in many cases sealed into the tanks to perform the cleaning process.

There are many examples of such cleaning systems. For example, Toftejom, Inc. of Pasadena, Tex.; Sellers Cleaning Systems of Piqua, Ohio; and Gamma Jet Cleaning Systems, Inc. of DeVault, Pa., all manufacture and sell such devices. These devices typically have one or more spray heads that have both horizontal and vertical rotational patterns. Examples of such cleaning devices can be found in U.S. Pat. No. 6,123,271 and U.S. Pat. No. 5,954,271.

FIGS. 1A–1C and 2 illustrate, respectively, a typical prior art spray head and a typical tank environment in which this prior art spray head is used. Referring to FIGS. 1A–1C, an inlet pipe 100 has a rotational sleeve 102 on which a spray head 104 is attached. Spray head 104 has situated around its perimeter a plurality of discharge nozzles 106 (three are shown in FIGS. 1A–1C). Spray head 104 rotates along axis A2 around the inlet pipe 100, and also rotates along axis A1, thereby resulting in a "three-dimensional" spray pattern.

Referring now to FIG. 2, a tank 210 has an inlet pipe 200 inserted therein, with the inlet pipe 200 having, in this example, two spray heads 204A and 204B, each of which correspond to the spray head detailed in FIGS. 1A–1C. In operation, the entire assembly (the inlet pipe 200 and the rotational spray heads 204A and 204B) is inserted into the tank 210 to be cleaned, and pressurized water is introduced into the inlet pipe 210. In a well known manner (see, e.g., the above-referenced U.S. Pat. Nos. 6,123,271 and 5,954,271), the introduction of the pressurized water into inlet pipe 200 causes the rotational movement of the spray heads 204A and 204B along both axes A1 and A2 of FIGS. 1A–1C, generating a spray pattern as illustrated generally by the solid arrows and dotted line arrows of FIG. 2. It is understood, of course, that the spray pattern illustrated in FIG. 2 is shown merely to illustrate the general idea of this prior art system and is not intended to shown the precise spray pattern of the spray heads.

Cleaning devices of the type described above operate quite well and are used throughout industry for cleaning purposes. However, it is often difficult to determine if the cleaning heads are functioning properly since, like the dishwasher described above, the operation of the device occurs inside the sealed vessel and out of the view of the operator. To ensure that the products contained in the vessels are not contaminated due to a poor cleaning cycle caused by a cleaning device malfunction, the operation of the cleaning devices should be monitored on a regular basis. Since this is difficult to accomplish, the common practice is to (1) periodically test the cleaning equipment outside of the vessel and/or (2) test the final product for contaminants after the fact. Periodically testing the cleaning equipment outside of the vessel, of course, only assures that the device is working when it is being tested, and not during operation. Testing the final product for contaminants after the fact, on the other hand, runs the risk of producing a bad batch of product and that must therefore be disposed of. In many instances the contaminated product is considered hazardous waste and must be disposed of at great cost and/or difficulty. Accordingly, it would be desirable to have a cleaning head monitoring system that can, on a real time basis, and from the exterior of the vessel, accurately monitor the operation of the cleaning head during the cleaning operation.

SUMMARY OF THE INVENTION

The present invention utilizes sound detection techniques and sound discrimination techniques to analyze the real time ongoing operational sounds generated during the operation of cleaning heads operating within a vessel to determine if the cleaning heads are operating properly. The term "sound," as used herein, includes mechanical vibrations both within and outside the perception of human hearing.

During a typical cleaning operation pressurized cleaning solution is dispensed through a nozzle assembly inside the vessel. In the case of a rotating spray head, as the nozzles rotate the spray moves about the interior of the vessel creating a unique sound pattern. By placing one or more pickups on the exterior of the vessel the sound is captured and fed to an analyzing device for analysis. Key properties such as, but not limited to, sound pressure levels, amplitude variations, spectral content, and rotational information are extracted and analyzed against the reference parameters.

In a preferred embodiment, "reference parameters" (also referred to as "sound signatures," "reference sound values," "reference frequency patterns") derived from a properly functioning cleaning cycle are compared with equivalent parameters derived on an ongoing basis during subsequent cleaning cycles (referred to herein as "ongoing operational sound values," "captured sound values," "measured frequency patterns"). Based upon the comparison, it is determined whether or not the cleaning heads are functioning properly. In a preferred embodiment, filtering techniques are used to increase the accuracy of the comparison.

DETAILED DESCRIPTION OF THE DRAWINGS

FIGS. 1A–1C illustrate a typical prior art spray head with which the present invention may be used;

DETAILED DESCRIPTION OF THE PREFERRED EMBODIMENT

Figure 3:
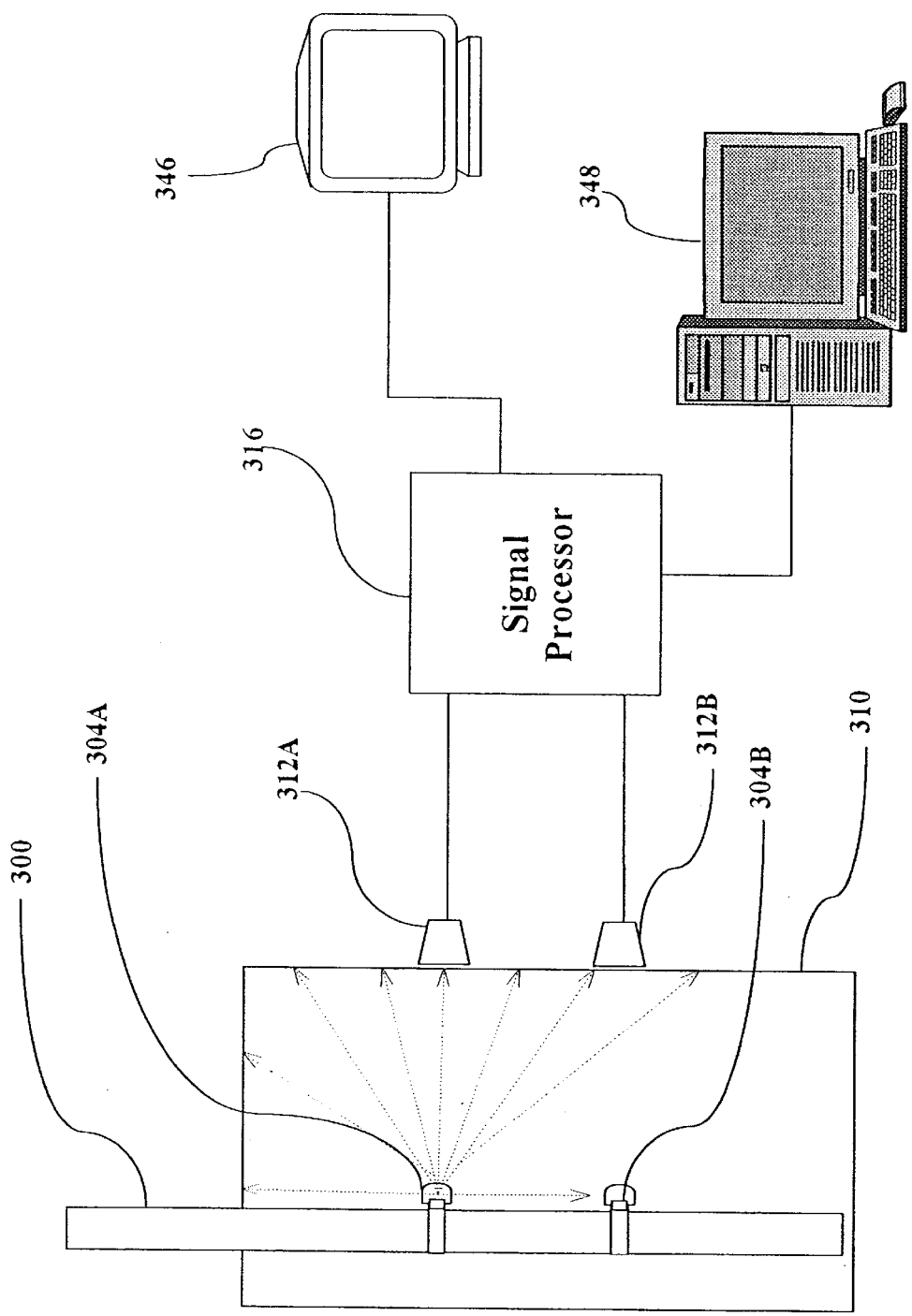
FIG. 3 illustrates an example of a dual cleaning head, dual sound sensor system in accordance with an embodiment of the present invention.
Figure 4:
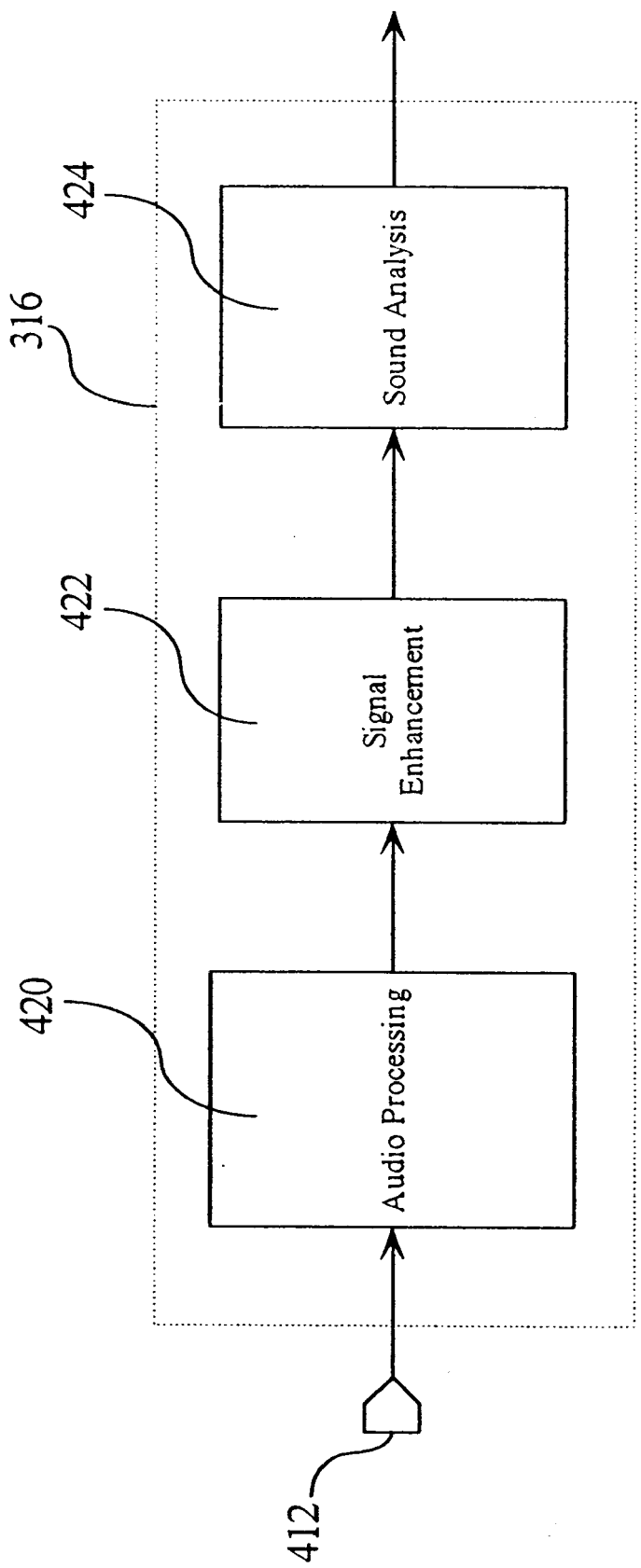
FIG. 4 is a block diagram illustrating the basic functions performed by a signal processor of Figure.

The present invention will now be described in detail with reference to FIGS. 3–8. FIGS. 3 and 4 illustrate an example in which two rotational cleaning heads and two sound sensing elements are utilized; it is understood, however, that more or less than two cleaning heads and/or sound sensing elements may be used and still fall within the scope of the claimed invention, and that the cleaning heads may include reciprocating, rotary, and/or stationary cleaning heads.

Figure 2:
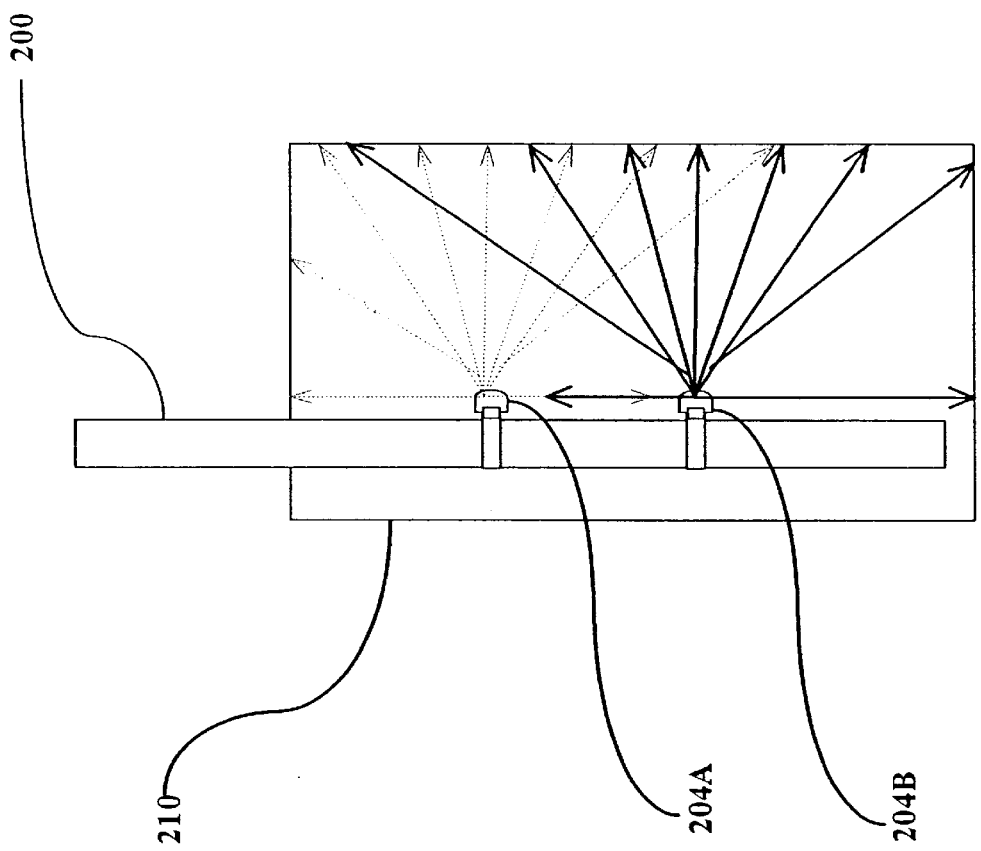
FIG. 2 illustrates a typical vessel configuration with which the present invention may be used.

Referring to FIG. 3, the present invention is described being utilized to monitor a cleaning system similar to that described in FIG. 2, specifically, a vessel 310 having inserted therein an inlet pipe 300 having attached thereto cleaning heads 304A and 304B. In accordance with the present invention, pickups 312A and 312B (e.g., microphones, transducers, or other spectral sensing elements) are pressed against and, preferably, temporarily or permanently affixed to, vessel 310. The area of the vessel immediately adjacent to each pickup is referred to herein as the "sensing area" of the pickup, i.e., the area of the vessel from which a pickup will sense sounds most strongly.

Each pickup and the signal processing (discussed below) associated with the sounds sensed by each pickup represents a separate "channel", i.e., a single-pickup system has one channel, a dual-pickup system has two channels, etc. Pickups 312A and 312B detect sounds occurring at their respective sensing areas and produce a sound signal corresponding to the sensed sounds in a well-known manner. The sound signals are input to a signal processor 316, details of which are described below in connection with FIGS. 4 and 5. A display 346 (e.g., a monitor or other display device) is connected to signal processor 316 to display results of the signal processing, if desired. A PC 348 or other processing device is attached to signal processor 316 to provide for data input and data storage and control of other functions based on the signal processing results.

FIG. 4 is a block diagram showing the basic functions performed by signal processor 316 to perform the analysis/validation method of the present invention. The method of the present invention can be performed using three basic blocks: an audio processing block 420; a signal enhancement block 422; and a sound analysis block 424. The signals sensed by one or more pickups (collectively identified by item 412 in FIG. 4) are processed in the audio processing block 420. If more than one pickup 412 is being used to sense the sound coming from inside the vessel, the signal enhancement block 422 is used to, for example, allow cancellation of certain sounds sensed from within the vessel. Finally, the sound analysis block 424 performs analysis on the received sounds to determine if the cleaning device is operating properly. Each of these blocks is discussed in more detail below in connection with FIG. 5.

Figure 5:
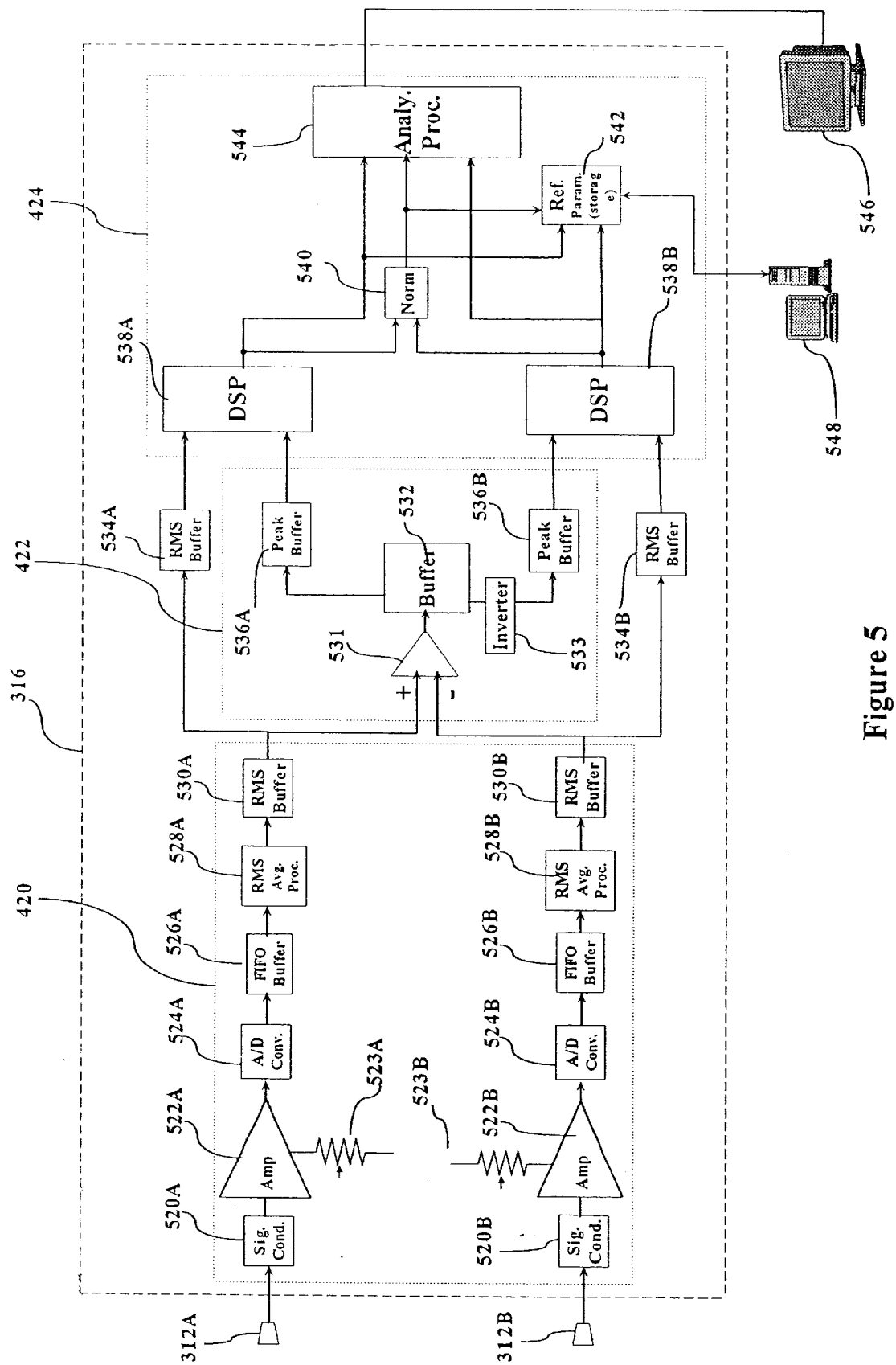
FIG. 5 is a detailed block diagram of an example of a 2-channel embodiment of the present invention.

FIG. 5 is a detailed block diagram of an example of a two-channel embodiment of the present invention. The block diagram illustrated in FIG. 5 is given by way of example only; it is understood other embodiments are contemplated that provide a signal processing system that receives input sound signals relating to the operation of one or more operational elements of a machine, analyzes the sound signals, and provides output identifying problems with the operational elements.

A signal conditioner 520A preconditions the signals received from pickup 312A. This preconditioning includes, but is not limited to, filtering out of unwanted noise components that are known to be irrelevant. For example, if the frequency of the sounds sensed by the pickups on a typical vessel centers around 1000 Hz., and if it is known that signal components above 1800 Hz. and below 200 Hz. are of little or no value, then signal conditioner 520A can be configured to comprise a filter that passes only a band of frequencies between 200 Hz. and 1800 Hz. (referred to herein as the "pass band"). This serves to improve the signal to noise ratio of the signal being analyzed. Any known filtering method may be utilized, for example, a simple RC filter.

An amplifier 522A amplifies the received signals to a desired level in a known manner. The purpose of the amplification performed by amplifier 522A is to set the signal level to the optimum level for the rest of the process performed by the system of the present invention. The sound signal is considered optimized when the peak signal into an analog-to-digital converter 524A (discussed below) is slightly below its full dynamic range. An adjustment means 523A (e.g., a potentiometer) allows adjustment of the gain of the amplifier so that it can provide the optimized signal; in a preferred embodiment the amplifier 522A and adjustment means 523A comprises a microprocessor configured in a known manner. The amplifier 522A is automatically adjusted by having the microprocessor configured to evaluate the output signal of the analog-to-digital converter and adjust the output of amplifier 522A to the optimized level.

The output of the amplifier 522A is fed to an analog-to-digital converter 524A where it is converted to a digital signal. While it is understood that the present invention can be practiced without converting the analog signal to a digital signal, a digital signal can be more easily and accurately processed. The A/D output is fed to FIFO buffer 562A. A FIFO buffer enables the output of the amplifier 522A to be sampled by A/D converter 524A at "M" samples per second and processed in 528A in frames (groups) of "N" samples per frame, where "M" and "N" are variables representing a predetermined number of samples, the exact number of which is discretionary to the user of the system. For example, using buffer 526A, the output of the amplifier 522A may be sampled and stored into buffer 528A at a rate of 11 K samples/second and output to 528A in frames of 1024 samples every 1024/11000 seconds. A processor 528A RMS averages the samples contained in the frame (a well-known math process which can be performed using, for example, prior art RMS averaging methods), storing the results in RMS buffer 530A as a single RMS value. Two tasks are accomplished by RMS averaging the samples in frames of "N" samples. First, the signal is low pass filtered (sample rate/frame size). Second, as additional frames are processed and stored in RMS buffer 530A, a running low-frequency RMS image of the sound fluctuations (referred to herein as an "envelope") caused by the spray moving throughout the vessel is obtained. The contents of buffer 530A can be analyzed, in whole or in part, for properties or patterns that characterize the spray inside the vessel.

The above description describes the operation of an exemplary structure for processing a signal obtained from first pickup 312A. The operation of and structure for processing a signal obtained from a second pickup 312B is essentially identical, using signal conditioner 520B, amplifier 522B, adjustment means 523B, A/D converter 524B, buffer 526B, processor 528B, and RMS buffer 530B.

If only a single pickup is being used, then the process can proceed directly to the sound analysis block 424 (described in more detail below) where the processed sound signals are analyzed to determine if the spray head(s) are operating properly. If two pickups are being used, however, in the preferred embodiment, signal enhancement processing is performed in signal enhancement block 422.

Typically, a pickup will be "paired" with a particular spray head or spray stream by locating the pickup in a position where it will receive the maximum sound from the spray head with which it is paired. For example, in the example illustrated in FIG. 3, spray head 20 304A is paired with pickup 312A, and spray head 304B is paired with pickup 312B. Since pickup 312A is placed to optimize the sensing of sound generated by spray head 304A (i.e., nearer to spray head 304A), it will pick up a very strong signal from spray head 304A when spray head 304A is directing a spray stream directly at the sensing area of pickup 312A. The same is true for spray head 304B and paired pickup 312B. For the purpose of this application, the spray head paired with a particular pickup is referred to herein as the "near head", and all other spray heads are referred to by the term "far head" relative to that pickup.

Figure 8:
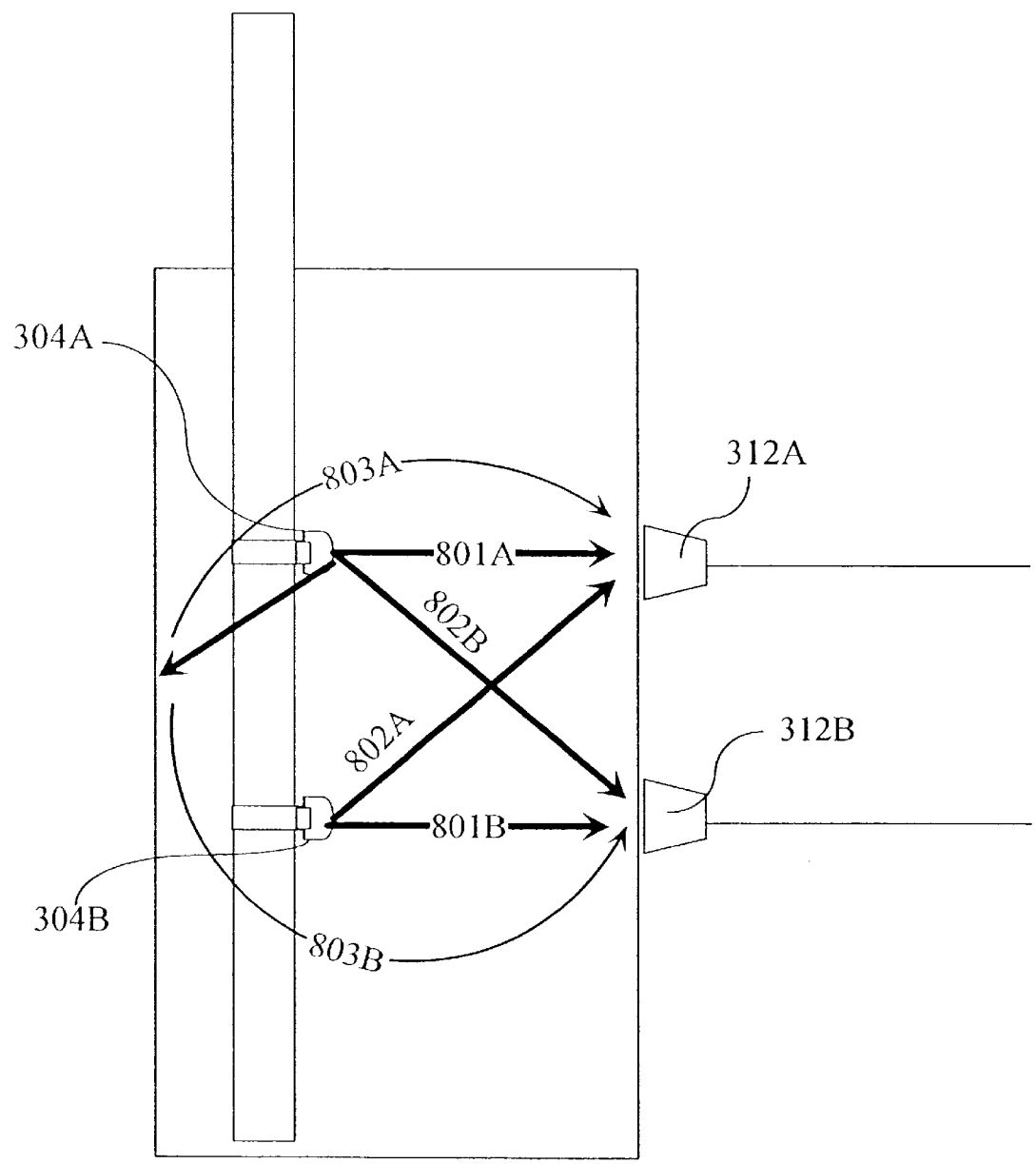
FIG. 8 is an illustration depicting the various sound components received by the sound sensing elements of the present invention.

Even though pickup 312A is placed to optimize the sensing of sound generated by spray head 304A, it will pickup all sounds within its sensing capability. FIG. 8 illustrates the three basic categories of sounds received by the pickups. Referring to FIG. 8, category #1 sounds are the sounds created by the spray from a spray head striking its near sensing area, as illustrated by lines 801A and 801B. Category #2 sounds are the sounds created by the spray from a spray head striking a far sensing area, as illustrated by lines 802A and 802B. Category #3 sounds are all other sounds, collectively, sensed by pickups 312A and 312B, including sounds related to sprays from both heads striking locations other than the sensing area of the pickups, the sounds of motors, pumps and machinery in or around the vessel, ambient sounds in the building in which the vessel sits (e.g., the sound of a forklift operating), and any other sounds unrelated to category#1 or category #2 sounds. The output signals from pickups 312A and 312B will be the RMS sum of all sound categories where the relative amplitude and spectral content of each category may vary, depending on conditions.

Figure 6A:
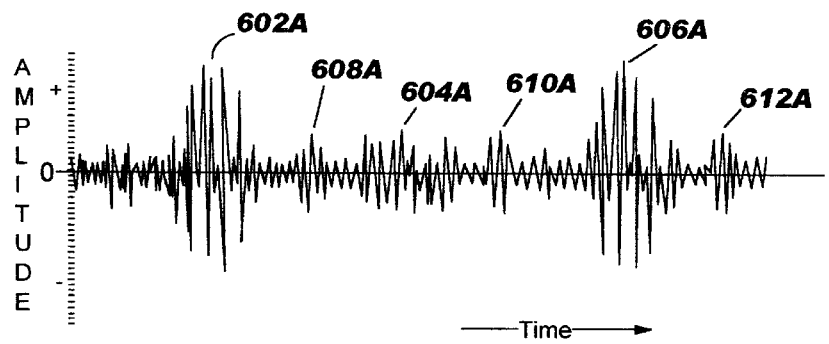
FIGS. 6A–6D are amplitude-over-time graphs illustrating the development of RMS images from raw signal data in accordance with the present invention.

FIG. 6A represents a typical "raw" (unprocessed) signal output from pickup 312A. FIG. 6C represents a typical raw signal output from pickup 312B. Referring to FIG. 6A, the area of the signal indicated by 602A and 606A represent the category #1 sound component caused by spray from the near spray head (304A) striking the sensing area around pickup 312A (represented by line 801A in FIG. 8). The area of the signal indicated by 604A represents the category #2 sound component caused by spray from the far spray head (304B) striking the sensing area around pickup 312A (represented by line 802A in FIG. 8). The area of the signal indicated by 608A, 610A and 612A represents category #3 sound components caused by other sources (represented by line 803A in FIG. 8).

Referring now to FIG. 6C, the area of the signal indicated by 604C represents the category #1 sound components caused by the spray from the near spray head (304B) striking the sensing area around pickup 312B (represented by line 801B in FIG. 8). The area of the signal indicated by 602C and 606C represents the category #2 sound components caused by the spray from the far spray head (304A) striking the sensing area around pickup 312B (represented by line 802B in FIG. 8), The area of the signal indicated by 608C, 610C and 612C represents the category #3 sound components caused by other sources (represented by line 803B in FIG. 8).

Depending on the analysis process to be used, some of the sound categories included in the raw signals may be undesirable or even detrimental to the goal of monitoring the operation of the spray heads. For example, to evaluate the signal from pickup 312A for sound properties specific to near spray head 304A, it is necessary to differentiate the sounds associated with spray head 304A from all other sounds comprising the raw signal. In some cases, the category #3 sound component of the raw signal is much greater than the category #1 sound component. This may be due to either extremely noisy environments, such as processing plants where a significant amount of machinery is used, or to the relatively weak spray streams produced by very small spray devices. The category #3 sound component may also have similar amplitude and spectral components as category #1 sound components making it more difficult to differentiate category #1 sound components. In order to more effectively be able to analyze the category #1 sound components, enhancing or separating the category #1 sound components from the composite signal can be performed as described below.

Figure 6B:
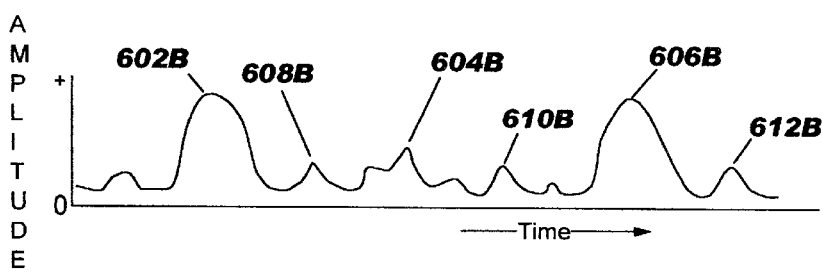
Figure 6C:
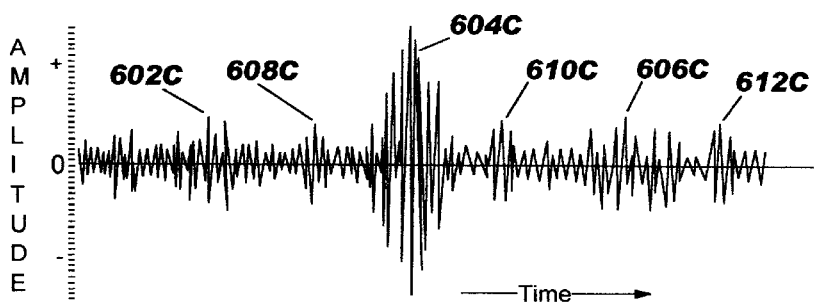
Figure 6D:
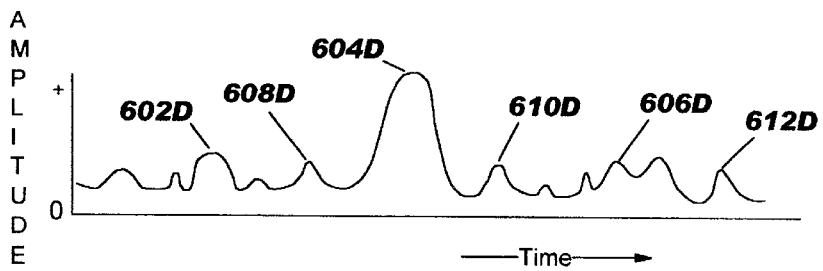
Figure 7:
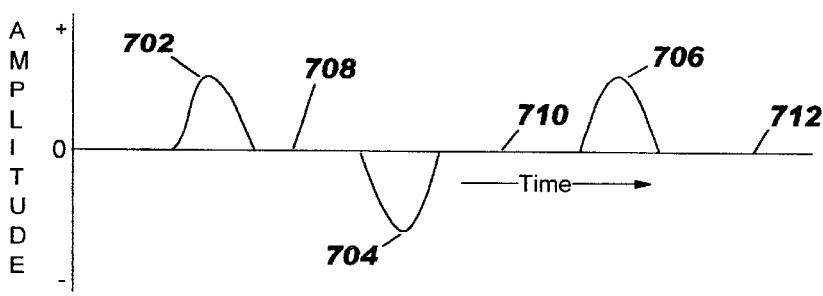
FIG. 7 is an amplitude-over-time graph illustrating an enhanced image of the rotational information related to spray devices in accordance with the present invention.

FIGS. 6B and 6D represent an image of the raw signals illustrated in FIGS. 6A and 6C, respectively, after they have been processed. They are typical of the images stored in buffers 534A and 534B (FIG. 5), after the raw signals of FIGS. 6A and 6C are processed in blocks 520A through 530A and blocks 520B through 530B. Since the image stored in buffers 534A and 534B represents the time RMS value of the digitized raw signal, it reflects all of the components found in the raw signal. Peaks 602B and 606B represent the desired category #1 sound component of the raw signal. In order to effectively analyze the category #1 sound component it can be separated from the composite signal. One method of doing this is by combining the signal from FIG. 6B with the inverted signal from FIG. 6D. Since peaks 608A and 608D represent category #3 sound components, they are essentially equal and thus, when peaks 608D are inverted (out of phase), they will cancel in the summing process described below. The same is true for peaks 610A and 610B, and 612A and 612B. There is also a DC offset component associated with FIG. 6B and FIG. 6D that represents the time RMS value of the background noise (steady state noise). Background noise is a category #3 sound component, is common to both pickups, and thus cancels in the summing process. What remains after summing are the peaks identified in FIGS. 6B and 6D as 602B, 606B, and 604D. FIG. 7 shows a series of positive and negative peaks that represent the result of this summing process. The positive going peaks shown in FIG. 7 as 702 and 706 are due to peaks 602B and 606B and represent they spray from head 304A passing the sensing area of pickup 312A. The negative going peak shown in FIG. 7 as 704 is due to peaks 604D and represents the spray from head 304B passing the sensing area of pickup 312B. FIG. 7 items 708, 710, and 712 represent the canceled remnants of category #3 components 608B, 610B, 612B, 608D, 610D, and 612D. By separating the positive peaks into one signal and the negative peaks into another, two new signals are obtained that significantly represent the rotational performance of spray head 304A and 304B, respectively.

One method of achieving the summing process is by use of the signal enhancement block 422 illustrated in FIG. 5. The RMS average of the latest (current) frame for each channel stored in RMS buffers 530A and 530B is supplied to a summing device 531. In the example shown in FIG. 5, the signal is being processed digitally and thus, the summing device can comprise a microprocessor. The summing device 531 subtracts the value in buffer 530B from the value in buffer 530A. The result is then stored in buffer 532. If the value stored in buffer 530A is greater than the value stored in buffer 530B, then the result stored in buffer 532 will be a positive value. If the value stored in buffer 530A is equal to the value stored in buffer 530B, then the result stored in buffer 532 will be 0. If the value stored in buffer 530A is less than the value stored in buffer 530B, then the result stored in buffer 532 will be a negative value.

When the result is a positive number, it is thus known that the RMS value stored in buffer 530A is greater than the RMS value stored in buffer 530B, and it is thus also known that the sound sensed at the sensing area of pickup 312A is greater than the sound sensed at the sensing area of pickup 312B; this allows us to identify which spray head (304A in this example) is being sensed at a particular time. Specifically, since it is known that the sound sensed at each pickup peaks when its sensing area is hit by the spray from its corresponding (near) spray head, then the positive peaks can be associated with spray head 304A and the negative peaks can be associated with spray head 304B.

Since the spray heads are typically not synchronized, from time to time the peaks associated with each contact with the sensing area of the pickups will coincide, and the sum of the signals, which would normally result in a peak indicative of one of the spray heads, will be significantly reduced or all together canceled out to a zero value. For example, if the spray from spray head 304A strikes the sensing area of pickup 312A at the same time as the spray from spray head 304B strikes the sensing area of pickup 312B, and if we assume that they strike their respective sensing areas at approximately equal velocities, then when they are summed, they will cancel each other, resulting in a zero-sum condition. The time interval from one peak to the next is a function of rotational velocity of a spray head, and the time interval between one "cancellation" and another is a function of the difference in rotational velocities of the multiple spray heads. These velocities are known and thus the cancellation can be compensated for in the analysis process, for example, by programming the processor to anticipate and disregard these zero-sum conditions, or by normalizing the two signals. The normalization process involves averaging the peak amplitude in buffers 536A and 536B for the last "N" seconds, and then dividing the 536A peak average by the 536B peak average. In the cancellation caused by the "beat", both the numerator and denominator are simultaneously reduced. Thus, both the numerator and the denominator in the normalization process are equally reduced and the normalized value remains essentially constant.

By separating the positive peaks from the negative peaks, sounds sensed by pickup 312A can be isolated from sounds sensed by pickup 312B for purposes of analysis. The existence of peaks (and thus valleys) indicates rotational movement. Obviously, if the spray head is not moving, it will be essentially a steady constant sound signal rather than one consisting of peaks and valleys. The average amplitude of the peaks is related to the intensity of the spray. The repetition rate of the peaks is related to the rotational velocity of the spray head. To isolate the positive peaks from the negative peaks, all positive results stored in buffer 532 are input into buffer 536A, and all negative results stored in buffer 532 are input to buffer 536B. If it is desired to work with only positive going pulses, once the signals are isolated as described above, the sign of the value of the negative peaks stored in buffer 532 can be inverted by inverter 533 prior to being stored in peak buffer 536B.

Since consecutive frames are made with consecutive blocks of samples, they establish a new, reduced sample rate equal to the initial sample rate divided by the frame size. Each summing of the values contained in buffers 530A and 530B represents a sample point at the new sample rate. When distributing the sum value between buffer 536A and buffer 536B, their sample rate, as well as the sample rate of buffers 534A and 534B, must be preserved. That is, after "N" summing operations, both buffer 536A and buffer 536B must contain "N" samples. Therefore, for every sum value sent to one buffer, a corresponding zero value must be sent to the other buffer to hold a place value. Each sample represents one clock pulse; by inserting a zero, the timing relationship between peaks is maintained, and it provides an indication that no amplitude information of importance is present. When a sum value equals zero (i.e., the cancellation situation discussed above), a zero must be sent to both buffer A and buffer B.

When the signal enhancement process is complete, there are four buffers containing sound signal data related to the sound of the spray heads in the tank: Buffer 534A, which contains the complete RMS signal from pickup 312A; buffer 536A, which contains the positive-going peaks from pickup 312A; buffer 534B, which contains the complete RMS signal from pickup 312B, and buffer 536B, which contains the negative-going peaks from pickup 312B (or, if inverted, a positive-going representation of the negative-going peaks from pickup 312B).

Using the four buffers described above gives the user of the present invention many options for analysis of the sound signals. It is understood that it is not necessary to use the outputs of all of the buffers to achieve the benefits of the present invention and, indeed, it may be desirable to use the data stored in less than all of the buffers, as described in more detail below. Obviously, if the output of certain buffers are never going to be used, these buffers and all processing steps/hardware associated with the contents of those buffers need not be included.

Digital Signal Processors (DSPs) 538A and 538B are coupled to receive data from buffers 534A/536A and 534B/536B, respectively, as illustrated in FIG. 5. DSPs 538A and 538B can comprise conventional programmable math processors which can be programmed to perform various calculations and/or run various algorithms to achieve desired results.

Buffers 534A and 534B contain the processed RMS "image" of the signal received by pickups 312A and 312B, respectively. The processed image is the low pass filtered envelope (a line approximating the peak values of the low pass filtered audio) of the raw audio received by the pickups. It should be remembered that this signal is not specific to any one source, but is a mix of sounds as discussed above. The processed images stored in buffers 534A and 534B are essentially the same as a series of repetitive peaks and valleys riding on top of a DC offset. They are used to detect the beginning and end of cycles, sound pressure levels, and pickup failures. They may be further evaluated for rotational or static properties that indicate the performance of the cleaning device.

High peaks indicate the point at which the spray from a near head passes the sensing area of its respective pickup, and smaller peaks are indicative of background sound and of sound sensed from less intense sprays (e.g., those from far heads) striking the sensing area of a particular pickup. FIGS. 6A through 6D illustrate these processed images and the raw signals from which they were derived, as described more fully below.

Specifically, FIG. 6A illustrates an example of an image of the raw data sensed by pickup 312A, and FIG. 6C illustrates and example of an image of the raw data sensed by pickup 312B. The signal conditioning performed by signal conditioners 520A and 520B may be used to clip out certain frequencies that are known to be outside the frequency that is known to be typical of sounds generated by the rotary cleaners being monitored (not shown), and then by RMS averaging the samples in frames of N samples as discussed above, the running low-frequency RMS representation of the spray can be drawn as an image (an envelope) as shown in FIGS. 6B (pickup 312A) and 6D (pickup 312B). The peaks 602A–602D correspond to the sensing of the spray from spray head 304A; peaks 604A–604D correspond to the sensing of the spray from spray head 304B; and peaks 606A–606D correspond to the sensing of the spray from spray head 304A during a second pass.

Obviously FIGS. 6A–6D illustrate only a portion of the stored image representation; the actual image continues over time during the cleaning cycle.

As can be seen, the sensing of the sound of spray head 304A by pickup 312A (602A, 602B; 606A, 606B) is significantly larger in amplitude than is the sensing of the sound of spray head 304A by pickup 312B (602C, 602D; 606C, 606D). Similarly, the sensing of the sound of spray head 304B by pickup 312B (604C, 604D) is significantly larger in amplitude than the sensing of the sound of spray head 304B by pickup 312A (604A, 604B).

There are other peak values 608A–D, 610A–D, and 612A–D in FIGS. 6A–6D. These peaks represent noise generated by sources other than the spray from the spray heads striking the sensing areas. Notably, the corresponding peaks (e.g., 608A–D) are substantially identical in amplitude, regardless as to which of the pickups senses them. This is consistent with the sensing of, for example, a sound generated by something outside of the tank and thus not "focused" on one of the sensing areas.

By observing the pattern of the processed RMS image, the beginning and end of a cycle can be determined. Likewise, by monitoring the magnitude of the peak values, sound pressure level changes, indicative of fluid pressure changes can be monitored, and if all peaks suddenly stop occurring, a pickup failure can be identified.

Buffers 536A and 536B store an enhanced image of the rotational information related to the respective spray devices. The enhanced image is acquired by canceling the other sound components (i.e., sound from other spray devices and sound from unrelated sources) as described above. The enhanced images stored in buffers 536A and 536B are used to detect individual device failures and are illustrated in FIG. 7. Comparing the enhanced image illustrated in FIG. 7 to the images of FIGS. 6A–6D, it can be seen that peaks 702 and 706 correspond to peaks 602A–D and 606A–D (associated with the sensing of the spray of spray head 304A) and peak 704 corresponds to peaks 604A–D (associated with the sensing of spray of spray head 304B). It is further noted that whereas the irrelevant noise peaks 608A–D, 610A–D, and 612A–D of FIGS. 6A–6D are visible, in the enhanced image of FIG. 7, these peaks are removed, as illustrated by the lack of any peaks at locations 708, 710, and 712.

As noted above, the stored images or other stored data is analyzed to ascertain information about the operation of the spray heads. As an example, to identify a device failure a "peak ratio" analysis may be performed using DSPs 538A and 538B, buffers 536A and 536B, and standard mathematical techniques.

EXAMPLE 1

Peak Ratio Analysis

Peak ratio is based on a comparison of the category #1 sound components between two or more spray heads. Since the pickups are fixed in relation to the spray devices, then the physical parameters such as spry angle and spray distance that normally impact sound levels at the pickup remain unchanged. As a result, if the fluid pressure remains constant, then the energy imparted to the pickup during each pass must also be a constant. If the average imparted spray energy recorded at pickup 312A is called "constant-A" ("average" meaning an average based on many passes of the spray over the sensing area) and the average imparted spray energy recorded at pickup 312B is called "constant-B", then a ratio of the two (constant-A/constant-B) will also remain essentially constant during normal operation. This calculation is based upon the assumption that both spray devices are attached to a common supply and as such are equally affected by pressure and fluid flows. Once this ratio is established it is monitored for change. If a substantial change is noted, then the ratio is evaluated to determine which spray head is at fault. Additional analysis may be performed using the contents of buffers 534A, 534B, 536Aa, and 536B to determine more information regarding the failure. Peak analysis requires comparative signals that closely reflect the energy imparted to the pickups by the passing spray. This signal can be found in the peak image stored in the buffers 536A and 536B.

Each time a spray head directs a spray at its paired pickup, the sound level recorded at that pickup rises sharply. This offsets the sound recorded by the second pickup at the same moment in time, causing a peak of the output of summing device 531. As discussed above, positive peaks relate to spray recorded by pickup 312A and are stored in buffer 536A, while negative peaks relate to spray recorded by pickup 312B and are stored in buffer 536B.

The amplitude of the peaks is related to the intensity of the spray recorded by pickups 312A and 312B, respectively. Since the ratio of the spray from A to spray B under normal circumstances is essentially constant, then the ratio of the enhanced images (average peak value 536A/average peak value 536B) is also essentially constant. The average value of buffers 536A and 536B is calculated by performing a running average of the peak amplitude over the last "N" seconds stored in 536A and 536B, respectively, where N seconds equals a frame size of 32 seconds.

The normal value for the ratio (average peak value 536A/average peak value 536B) is determined by performing a learn cycle on a known properly-performing wash cycle. The "normal value" is stored as the reference for future wash cycles.

If device A slows, stops or clogs, the average value of 536A will decrease and the ratio of the average value of 536A to the average value of 536B will also decrease, and this ratio will be less than the reference value. If device B slows, stops or clogs, the average value of 536B decreases and the ration of the average value of 536A to the average value of 536B will increase, and the ratio will be greater than the reference value.

By setting limits around the reference values, not only can a failure be determined, but which device failed can also be determined. These limits may either be learned by performing learn cycles on failed devices or manually established.

EXAMPLE 2

Peak Sum Analysis

Peak sum analysis is based upon the same basic theory as peak ratio analysis. The primary difference is that in calculating the peak ratio, the average peak value 536A is divided by average peak value 536B, whereas in calculating the peak sum, the average peak value 536A and 536B are added together.

One aspect of using peak sum analysis is that when the peak sum indicates a failure it does not identify which head had failed. Regardless of which spray head fails, the failed peak sum value is always going to be less than the reference value. Thus, to determine which spray head had failed, additional analysis is necessary when two or more spray heads are in use.

If spray head 304A slows, stops or clogs, the average value stored in buffer 536A decreases and the sum of the average value stored in buffer 536A plus the average value stored in 536B decreases, and the sum will be less than the reference value. If spray head 304B slows, stops or clogs, the average value stored in 536B decreases and the sum of the average value stored in 536A and the average value stored in device 536B also decreases and the sum will, again, be less than the reference value.

The "normal" value for the sum equals (average peak value 536A) plus (average peak value 536B) and this is determined by performing a learn cycle on a known properly-operating wash cycle. The normal value is stored as the reference for future wash cycles.

By setting limits around the reference, it is possible to detect a failure condition. Limits may either be learned by doing learn cycles on failed devices, or manually established. As stated above, when a failure is detected, additional analysis is required to determine which spray head has failed.

EXAMPLE 3

Fast Fourier Transform Analysis

Alternatively, all four buffered values can be subjected to a fast Fourier transform (FFT) in a known manner to develop spectrum corresponding to the stored signals. As noted above, each time the spray from a near head passes its associated pickup, the sound level sensed by that pickup rises sharply. Positive peaks relate to, in the above example, pickup 312A and are stored in buffer 536A; negative peaks relate to spray sensed at pickup 312B and are stored in buffer 536B. The repetition rate associated with the peaks is a function of the number of nozzles on a particular spray head (a known quantity) times the rotational velocity of the spray head. Thus, by determining the fundamental frequency (repetition rate) of the peaks, it is possible to determine the rotational velocity of the respective device.

FFT is used to evaluate the spectral content of a signal. In the present invention, FFT can be used to acquire fundamental frequency values related to the peaks stored in buffers 536A and 536B. Using standard mathematical computation performed by, for example, DSPs 538A and 538B, knowledge of the frequencies and the number of nozzles on each spray head allows the calculation of this rotational velocity. The "normal" value for the rotational velocity can be determined by performing a learn cycle on a known properly-operating wash cycle and storing it as the reference for future wash cycles and comparison with the values calculated by FFT. By setting limits around the reference value, a failure condition can be detected.

As noted above, in a preferred embodiment, sound signatures are first developed which comprise the collection of sound signals from the vessel when the cleaning system is known to be operating properly. This "learn cycle" develops reference parameters which are stored in a reference parameter memory 542, which are compared with the real-time signals and data pertaining thereto as they are gathered from the system. As described above, by comparing the sound signature with the real-time "signature", a determination can be made as to whether or not the system is operating properly. This can be performed manually, i.e., by visual examination by an operator, or it can be performed automatically using known processing methods to determine threshold differences and trigger alarms when certain thresholds are met.

Reference parameter memory 542 can also be used to store historical data relating to ongoing sound measurements, as well as for storing "set up" parameters. For example, as noted above, amplifiers 522A and 522B have gain settings which are also determined during the learn cycle. These settings may vary from one "subcycle" to the next (e.g., a prewash cycle might have different gain settings than a final rinse cycle) and the reference parameter memory 542 can be used to store setup parameters for multiple cycles.

Analysis processor 544 performs evaluation of the results of the more complex math functions carried out by the DSPs 538A and 538B. Analysis processor 544 receives the ongoing data from the DSPs, the reference data from reference parameter memory 542, and compares the values using a predetermined algorithm, which algorithm may vary depending on the needs of the user.

For example, at the beginning of a new subcycle the analysis processor 544 can recall the reference peak ratio value stored during the learn cycle. It can then multiply and divide the reference peak ratio value by a predetermined factor (e.g., 8), and store the results in RAM. Reference value times 8 represents the upper acceptable pass/fail limit while reference divided by 8 represents the lower acceptable pass/fail limit. It will then wait for the subcycle to get up to operating speed.

At this time the DSPs begins outputting the ongoing peak ratio value. The analysis processor 544 compares the ongoing peak ratio value from the DSP(s) to the reference peak value ratios stored in RAM. If the current peak ratio value is between the pass/fail limit values stored in RAM, then a "pass" condition is identified. If the current peak ratio value is outside the two values stored in RAM, then a timer can be started. If the current peak ratio value drops back between the reference values before a predetermined amount of time elapses, then the timer is reset. If the current peak ratio value remains outside the reference values and the timer times out, a fail condition is identified. Once a fail has been identified, an alarm can be activated and remain so until reset either manually or through other means.

A similar process can be performed based on FFT. In this case, at the beginning of a new subcycle, the analysis processor 544 recalls the reference value(s) for the rotational velocity(s) stored during the learn cycle. It then sets limits around the reference value(s) and stores the result in RAM, and waits for the subcycle to get up to operating speed.

At this time the DSPs begin outputting the ongoing rotational velocity(s). The output processor compares the values in RAM to the last ongoing rotational velocity value(s) acquired from the DSP(s). If the ongoing value is within the limits stored in RAM, then a pass is identified. If the ongoing value is greater than or less than the limits stored in RAM, a timer is activated. If the ongoing value drops back before the timer times out, then the timer is reset. If the value persists and the timer times out, a fail is identified.

The overall sound level can also be monitored. In this case, at the beginning of a new subcycle the analysis processor 544 recalls the reference sound level value stored during the learn cycle. It then sets limits around the reference sound level value and stores the result in RAM, and waits for the subcycle to get up to operating speed. At this time the DSPs begin outputting the ongoing sound level values. The analysis processor 544 compares the reference values in RAM to the last sound level value acquired from the DSP(s). If the last sound level value acquired is within the limits stored in RAM, a pass is identified. If the last sound value acquired is greater than or less than the limits stored in RAM, a timer is activated. If the sound level value drops before the timer times out, the timer is reset. If the sound level value persists and the timer times out, a fail is identified. The sound levels are an indicator of fluid pressure. The higher the pressure, the higher the sound produced by the wash operation. The converse is true for low pressure. Sound levels may also be an indicator of external problems like faulty pumps or other machinery.

Once pass/fail has been established, the analysis processor can activate the output devices, (i.e. relays, lights, displays, chart recorders, etc.) to alert users as to the operating condition of the system.

As mentioned above, while the example given above illustrates the use of the present invention in connection with a two-head system, it is understood that systems with only one head or having more than two heads are also considered covered by the appended claims. In single head processing, the signal enhancement, peak normalization, and peak summation processes described above are not needed. Instead, analysis (e.g., FFT; zero-crossing detection based on the "AC component" obtained from RMS buffer 534A with statistical averaging; threshold detection based on DC rectification of the AC component obtained from RMS buffer 534A, amplitude analysis of the "AC" and "DC" components) can be performed directly.

Although the present invention has been described with respect to a specific preferred embodiment thereof, various changes and modifications may be suggested to one skilled in the art and it is intended that the present invention encompass such changes and modifications as fall within the scope of the appended claims. For example, while particular methods of signal processing, signal enhancement, noise cancellation, and signal analysis are illustrated, it is understood that any known methods for achieving the results obtained by the specifically-described methods maybe utilized and fall within the scope of the present invention.

What is claimed is:

1. A method for evaluating the operating status of a cleaning device from the exterior of a vessel, comprising the steps of:

developing reference parameters based upon sound signals derived from proper operation of said cleaning device in the interior of said vessel;

capturing sound signals from the exterior of said vessel when the cleaning device is in operation;

comparing said captured sound signal with said reference parameters; and outputting indicia of the operating status of said cleaning device based upon said comparison.

2. A method as set forth in claim 1, wherein said cleaning device includes one or more rotary spray heads operating inside said vessel and wherein one or more sound pickups are coupled to the exterior of said vessel, and wherein said capturing step comprises at least the steps of:
    associating a different sound pickup with each rotary spray head;
    sensing sounds, generated by each rotary spray head, using each rotary spray head's associated sound pickup; and
    storing said sensed sounds as captured sound signals.

3. A method as set forth in claim 2, wherein said associating step comprises at least the step of positioning said sound pickups so that each pickup is closer to its associated spray head than it is to all other spray heads.

4. A method as set forth in claim 3, wherein said reference parameters comprise reference frequency-patterns corresponding to a properly operating rotary spray head, and wherein said comparison step comprises at least the steps of:
    storing said sensed sounds as measured frequency-patterns representing said sensed sounds;
    comparing the reference frequency-patterns with said measured frequency-patterns;
    outputting an indication of proper operation when each of said reference frequency-patterns matches a corresponding measured frequency-pattern; and
    outputting an indication of improper operation when at least one of said reference frequency-patterns does not match its corresponding measured-frequency pattern.

5. A method as set forth in claim 4, wherein said reference frequency-patterns and said measured frequency-patterns comprise RMS averages of frames of said reference sound signals and said measured sound signals, respectively, said frames being of a predetermined size.

6. A method as set forth in claim 5, wherein said reference frequency patterns further comprise enhanced averages of said frames.

7. A method as set forth in claim 1, wherein said cleaning device includes a moving element.

8. A method as set forth in claim 7, wherein said moving element is a rotary element.

9. An apparatus for evaluating the operating status of a rotary element cleaning device from the exterior of a vessel, comprising:
    a sound recording system positioned on the exterior of said vessel and configured to record sounds occurring on the interior of said vessel;
    a sound analyzer coupled to said sound recording system and configured to analyze sounds recorded by said sound recording system; and
    a display coupled to said sound analyzer and configured to display results of said analysis of said sounds recorded by said sound recording system;
    wherein said display provides an indication of the operating status of said rotary element cleaning device based on the analysis performed by said sound analyzer.

10. An apparatus as set forth in claim 9, wherein said rotary element cleaning device includes one or more rotary spray heads operating inside said vessel, and wherein said sound recording system comprises:
    one or more transducers coupled to the exterior of said vessel, with a different transducer being associated with each rotary spray head.

11. An apparatus as set forth in claim 10, wherein said sound recording system further comprises:
    means for sensing sounds, generated by each rotary spray head, using each rotary spray head's associated transducer; and
    means for storing said sensed sounds as captured sound signals.

12. An apparatus as set forth in claim 11, wherein said transducers are associated with each rotary spray head by positioning said transducers so that each transducer is closer to its associated rotary spray head than it is to all other rotary spray heads.

13. An apparatus as forth in claim 12, further comprising:
    means for developing reference parameters comprising reference frequency-patterns corresponding to a properly operating rotary spray head;
    means for storing said sensed sounds as measured frequency-patterns representing said sensed sounds;
    means for comparing the reference frequency-patterns with said measured frequency-patterns;
    means for outputting an indication of proper operation when each of said reference frequency-patterns matches a corresponding measured frequency-pattern; and
    means for outputting an indication of improper operation when at least one of said reference frequency-patterns does not match its corresponding measured-frequency pattern.

14. A method for evaluating the operating status of a rotary element cleaning device from the exterior of a vessel in which the rotary element cleaning device operates, comprising the steps of:
    developing reference sound values corresponding to sounds made by the rotary element cleaning device when it is operating properly and storing said developed reference sound values;
    capturing ongoing operational sounds using a sensor coupled to the exterior of said vessel;
    processing said captured ongoing operational sounds and storing said processed captured sounds;
    analyzing said operating status of said rotary element cleaning device by comparing said reference sound values and said processed captured sounds; and
    outputting an indication of the operating status of said rotary element cleaning device.

15. A method for evaluating the operating status of a rotary element cleaning device from the exterior of a vessel in which the rotary element cleaning device operates, comprising the steps of:
    developing reference sound values corresponding to sounds made by the rotary element cleaning device when it is operating properly and storing said developed reference sound values;
    developing, using a sensor coupled to the exterior of said vessel, ongoing operational sound values corresponding to sounds made by the rotary element during actual operation and storing said developed ongoing operational sound values;
    analyzing said operation status of said rotary element cleaning device by comparing said reference sound values and said captured ongoing operational sound values; and
    outputting an indication of the operating status of said rotary element cleaning device based on said comparison.

16. A method for evaluating the operation of a cleaning device from the exterior of a vessel in which the cleaning device operates comprising the steps of:
    sensing mechanical vibrations generated in the interior of said vessel when said cleaning device is in operation;

comparing said sensed mechanical vibrations to predetermined reference parameters; and indicating the results of said comparison.

17. The method of claim 16 wherein said cleaning device includes a moving element.

18. The method of claim 17 wherein said moving element includes a rotary element.

19. The method of claim 16 wherein said step of sensing mechanical vibrations senses sounds.

20. The method of claim 19 wherein said sounds are sensed utilizing a transducer coupled to the exterior of said vessel.

21. The method of claim 16 further including the step of developing said reference parameters based upon mechanical vibrations derived from proper operation of said cleaning device in the interior of said vessel.

22. An apparatus for evaluating the operation of a cleaning device from the exterior of a vessel in which the cleaning device operates, comprising:

at least one transducer sensing mechanical vibrations generated in the interior of said vessel when said cleaning device is in operation;

comparing means for comparing said sensed mechanical vibrations to predetermined reference parameters; and an indicator indicating the results of said comparison.

23. The apparatus of claim 22 wherein said cleaning device includes a moving element.

24. The apparatus of claim 23 wherein said moving element includes a rotary element.

25. The apparatus of claim 22 wherein each of said at least one transducers senses sounds.

26. The apparatus of claim 25 wherein each of said at least one transducers are coupled to the exterior of said vessel.

27. The apparatus of claim 22 further including means for developing said reference parameters based upon mechanical vibrations derived from proper operation of said cleaning device in the interior of said vessel.

* * * * *